United States Patent
Wee et al.

(10) Patent No.: US 8,948,530 B2
(45) Date of Patent: Feb. 3, 2015

(54) ADAPTIVE IMAGE COMPRESSION SYSTEM AND METHOD

(71) Applicants: Quram Co., Ltd., Suwon-si (KR); Fingram Co., Ltd, Suwon-si (KR)

(72) Inventors: Young Cheul Wee, Suwon-si (KR); Young Hoon Ahn, Suwon-si (KR); Sung Soo Park, Suwon-si (KR)

(73) Assignees: Quram Co., Ltd. (KR); Fingram Co., Ltd. (KR)

( * ) Notice: Subject to any disclaimer, the term of this patent is extended or adjusted under 35 U.S.C. 154(b) by 91 days.

(21) Appl. No.: 13/804,282

(22) Filed: Mar. 14, 2013

(65) Prior Publication Data

US 2014/0056516 A1 Feb. 27, 2014

(30) Foreign Application Priority Data

Aug. 22, 2012 (KR) .......................... 10-2012-0091873

(51) Int. Cl.
 *G06K 9/36* (2006.01)
 *G06T 9/00* (2006.01)

(52) U.S. Cl.
 CPC ........................................ *G06T 9/00* (2013.01)
 USPC ............ 382/239; 382/232; 382/251; 382/166

(58) Field of Classification Search
 CPC ....... H04N 7/26244; H04N 7/50; H04N 7/30; H04N 7/26127; H04N 7/26271; H04N 7/26085; H04N 7/26079; H04N 7/26313; H04N 7/26106; H04N 1/64; H04N 7/26148; G06T 9/005

USPC .............. 382/232, 239, 251, 166; 360/48, 53; 369/124.06; 375/E7.04, E7.088
 See application file for complete search history.

(56) References Cited

U.S. PATENT DOCUMENTS

| | | | | | |
|---|---|---|---|---|---|
| 5,777,812 | A | * | 7/1998 | Kim ................................. | 360/48 |
| 5,892,847 | A | * | 4/1999 | Johnson ........................ | 382/232 |
| 6,124,995 | A | * | 9/2000 | Kim ................................. | 360/48 |
| 6,349,151 | B1 | * | 2/2002 | Jones et al. .................... | 382/251 |
| 6,356,668 | B1 | * | 3/2002 | Honsinger et al. ............ | 382/251 |
| 6,453,073 | B2 | * | 9/2002 | Johnson ........................ | 382/239 |

FOREIGN PATENT DOCUMENTS

JP 2009027664 2/2009

* cited by examiner

*Primary Examiner* — Anh Do
(74) *Attorney, Agent, or Firm* — Cantor Colburn LLP

(57) ABSTRACT

Provided are an adaptive image compression system and method. The adaptive image compression method includes a step of determining, at an adaptive image compression system, characteristics of an image that is to be compressed, a step of determining, at the adaptive image compression system, a quantization scale factor based on the characteristics of the image that is to be compressed, a step of generating an adaptive quantization table corresponding to the image that is to be compressed based on the determined quantization scale factor, and a step of encoding the image that is to be compressed using the generated adaptive quantization table.

13 Claims, 5 Drawing Sheets

FIG. 1 *PRIOR ART*
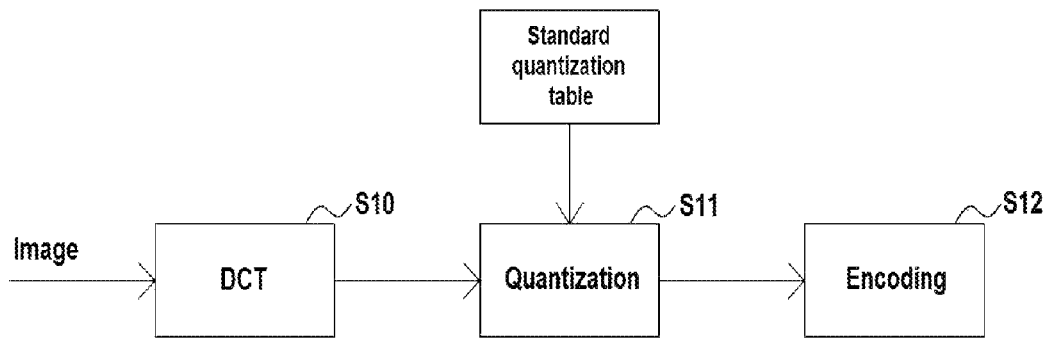
FIG. 2 *PRIOR ART*
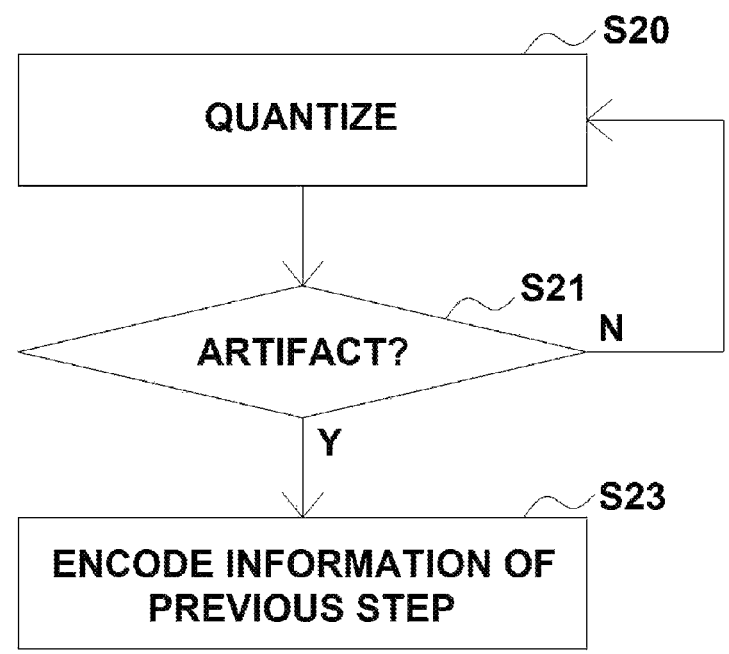

FIG. 6

| RAW image | ORG JPEG | Atom JPEG | | JPEG Mini | |
|---|---|---|---|---|---|
| Size (Kbyte) | Size (Kbyte) | PSNR | Size (Kbyte) | PSNR | Size (Kbyte) |
| 1.9M | 254 | 45.0 | 202 | 43.1 | 210 |
| 11M | 6581 | 42.0 | 1434 | 40.9 | 1880 |
| 15M | 11142 | 39.6 | 2021 | 39.4 | 3003 |
| 21M | 13207 | 44.6 | 2031 | 43.3 | 1760 |
| | | | | | |

ADAPTIVE IMAGE COMPRESSION SYSTEM AND METHOD

BACKGROUND OF THE INVENTION

1. Field of the Invention

The present invention relates to an adaptive image compression system and method, and more particularly, to an adaptive image compression system and method which can efficiently compress an image by analyzing the characteristics of the image to be compressed and determining a loss tolerance in which similar image quality can be maintained before compressing the image.

2. Description of Related Art

A variety of traditional image compression methods are well known in the art, in which joint photographic experts group (JPEG) compression is most popular and is widely used as the standard for compressing and expressing images.

Although the technical principle of the present invention can be applied to all types of data compression methods, an application thereof to the JPEG will be described as a representative example.

FIG. 1 is a block diagram schematically showing a method of generating a JPEG image of the related art.

Referring to FIG. 1, the JPEG is a method of compressing and storing original images. The JPEG method converts an original image into a frequency space data via discrete cosine transform (DCT) at S10, lossy-compresses the converted data by quantizing the converted data using a standard quantization table at S11, and generates a compressed image data by encoding the lossy-compressed data at S12.

When the lossy-compression such as JPEG is carried out, most loss in information occurs during the quantization. Therefore, in this method, the image compression ratio mainly depends on the scale at which the quantization is carried out.

However, it is preferred that an image be compressed within the range in which the visible image quality of a user does not greatly degrade. For example, although an increase in the image compression ratio (i.e. the increased quantization scale) has the effect of the decreased data size of the compressed image, this may significantly degrade the visual image quality, which is problematic. In addition, although a decrease in the image compression ratio does not significantly degrade the image quality, the degree to which the data is compressed is insignificant, which is problematic.

Therefore, a method of maximizing the compression ratio while maintaining visible image quality within the range of similar image quality (i.e. the range of image quality in which it is difficult to visibly discriminate visible image quality from original image quality), i.e. a method of optimizing the compression ratio with respect to the image quality, is being actively studied.

A related traditional method uses a scheme of searching for an optimization compression ratio by generally carrying out iterative compression (e.g. JPEG mini). FIG. 2 shows such an example of this method.

Referring to FIG. 2, the method of the related art includes step S20 of quantizing an image that is converted into a data in a frequency range at a predetermined quantization scale, i.e. adjusting DCT coefficients for respective blocks, and step S21 of determining whether or not image quality has degraded. When the image quality has not degraded, the method iterates the step S20 of adjusting DCT coefficients for respective blocks. In order to determine whether or not the image quality has degraded, it is possible to use a scheme of inspecting whether or not an artifact, i.e. an artificial image that causes discrepancies from similar image quality, has occurred. Of course, also in this case, the quantization can use a quantization table that corresponds to the quantization scale according to each step. The quantization scale according to each step is determined based on the value of the difference between the previous image and the compressed image. In addition, when the artifact is produced due to the iterative compression, at step S23, the compression can be completed by encoding information that has been compressed in the previous steps.

However, such a compression method of the related art may be inefficient since quantization is carried out without considering whether the image to be compressed is a complicated image, the visual image degradation of which is relatively small even though much of the information is lost, or is a simple image, the visual image degradation of which is relatively great even though less of information is lost. In addition, the compression speed is slow since the method iteratively determines whether or not to carry out the compression again or stop the compression once having carried out compression.

In addition, it is impossible to ensure that the final result of the compression be the optimum compression ratio, which is problematic. This is because, although the result of the previous quantization step becomes the final result of the compression when an artifact occurs as a result of the quantization step that is finally carried out, the result of the previous quantization step does not guarantee that the image is compressed at the optimization compression ratio.

Therefore, a method is required which non-iteratively compresses an image by determining a quantization level that guarantees visible image quality according to DCT coefficients depending on the characteristics of an image unlike the method of the related art. That is, a compression method is urgently required which determines a loss tolerance in which similar image quality is maintained by analyzing the characteristics of an image, determines in advance a quantization scale that is to be used for compression, and then generates an adaptive quantization table corresponding to the determined quantization scale. This method can consequently increase a compression ratio within the range of similar image quality by compressing the image once.

BRIEF SUMMARY OF THE INVENTION

Various aspects of the present invention provide an adaptive image compression system and method which can guarantee that a result of compression provides image quality similar to original image quality and improve a compression speed by carrying out the compression in one step by determining a quantization level that guarantees visible image quality according to DCT factors depending on the characteristics of an image before the compression instead of iteratively carrying out the process of determining whether or not the result of the compression provides image quality that is within the range of similar image quality.

In an aspect of the present invention, provided is an adaptive image compression method that includes the following steps of: determining, at an adaptive image compression system, characteristics of an image that is to be compressed; determining, at the adaptive image compression system, a quantization scale factor based on the characteristics of the image that is to be compressed; generating an adaptive quantization table corresponding to the image that is to be compressed based on the determined quantization scale factor; and encoding the image that is to be compressed using the generated adaptive quantization table.

The step of determining, at the adaptive image compression system, the characteristics of the image that is to be compressed may include: dividing a gray image corresponding to the image that is to be compressed into a plurality of blocks; calculating a characteristic value of each of the divided blocks; and determining the characteristics of the image that is to be compressed based on the calculated characteristic value of each of the divided blocks.

The step of calculating the characteristic value of each of the divided blocks may include calculating, at the adaptive image compression system, an average value of each differential value of pixels that are included in one of the blocks, wherein the differential value is an average of differences between a pixel value of a predetermined pixel and pixel values of pixels surrounding the predetermined pixel.

The step of determining the characteristics of the image that is to be compressed based on the calculated characteristic value of each of the divided blocks may include: classifying, at the adaptive image compression system, a characteristic of each of the blocks based on the characteristic value of each of the blocks; and determining the characteristics of the image that is to be compressed based on the classified characteristic of each of the blocks.

The step of determining, at the adaptive image compression system, the quantization scale factor based on the characteristics of the image that is to be compressed may include determining, at the adaptive image compression system, a quantization scale factor value corresponding to the image that is to be compressed based on a quantization scale factor determination list that includes information about a corresponding quantization scale factor value according to the determined characteristics of the image that is to be compressed.

The step of generating the adaptive quantization table corresponding to the image that is to be compressed based on the determined quantization scale factor compressed may include generating, at the adaptive image compression system, a gray adaptive quantization table and a color adaptive quantization table based on the determined quantization scale factor and a reference quantization table.

In another aspect of the present invention, the adaptive image compression method can be stored as a program in a computer readable record medium.

In a further aspect of the present invention, provided is an adaptive image compressing system that includes a characteristic determination module which determines characteristics of an image that is to be compressed; a quantization scale factor determination module which determines a quantization scale factor based on the determined characteristics of the image that is to be compressed; an adaptive quantization table generation module which generates an adaptive quantization table corresponding to the image that is to be compressed based on the determined quantization scale factor; and an encoder which encodes the image that is to be compressed using the generated adaptive quantization table.

The characteristic determination module may divide a gray image corresponding to the image that is to be compressed into a plurality of blocks, calculate a characteristic value of each of the divided blocks, and determine the characteristics of the image that is to be compressed based on the calculated characteristic value of each of the divided blocks.

The characteristic determination module may calculate an average value of each differential value of pixels included in one of the blocks as the characteristic value. The differential value is an average of differences between a pixel value of a predetermined pixel and pixel values of pixels surrounding the predetermined pixel.

The characteristic determination module may classify a characteristic of each of the blocks based on a classification reference of the characteristic value of each of the blocks, and determine the characteristics of the image that is to be compressed based on the classified characteristic of each of the blocks.

The quantization scale factor determination module may determine a quantization scale factor value corresponding to the image that is to be compressed based on a quantization scale factor determination list that includes information about a corresponding quantization scale factor value according to the determined characteristics of the image that is to be compressed.

The adaptive quantization table generation module may generate a gray adaptive quantization table and a color adaptive quantization table based on the determined quantization scale factor and a reference quantization table.

According to embodiments of the invention as set forth above, since compression is completed by one quantization step after a degree of the compression, or a quantization scale, is determined in advance according to the characteristics of an image, the compression speed is significantly improved, which is advantageous.

In addition, since the compression can be carried out considering the characteristics, complexity and image quality of the image that is to be compressed, degradation in the image can be reduced.

Furthermore, since an adaptive quantization table is used, the compression ratio can be relatively high.

BRIEF DESCRIPTION OF THE DRAWINGS

Brief descriptions of individual figures are given in order to enhance understanding of the drawings which are referred to in the Detailed Description of the Invention section.

FIG. 1 is a block diagram schematically showing a JPEG compression method of the related art;

FIG. 2 is a flowchart schematically showing a iterative compression scheme of the related art;

FIG. 6 is a table showing a performance simulation result obtained by an adaptive image compression method according to an embodiment of the present invention.

DETAILED DESCRIPTION OF THE INVENTION

Figure 3:
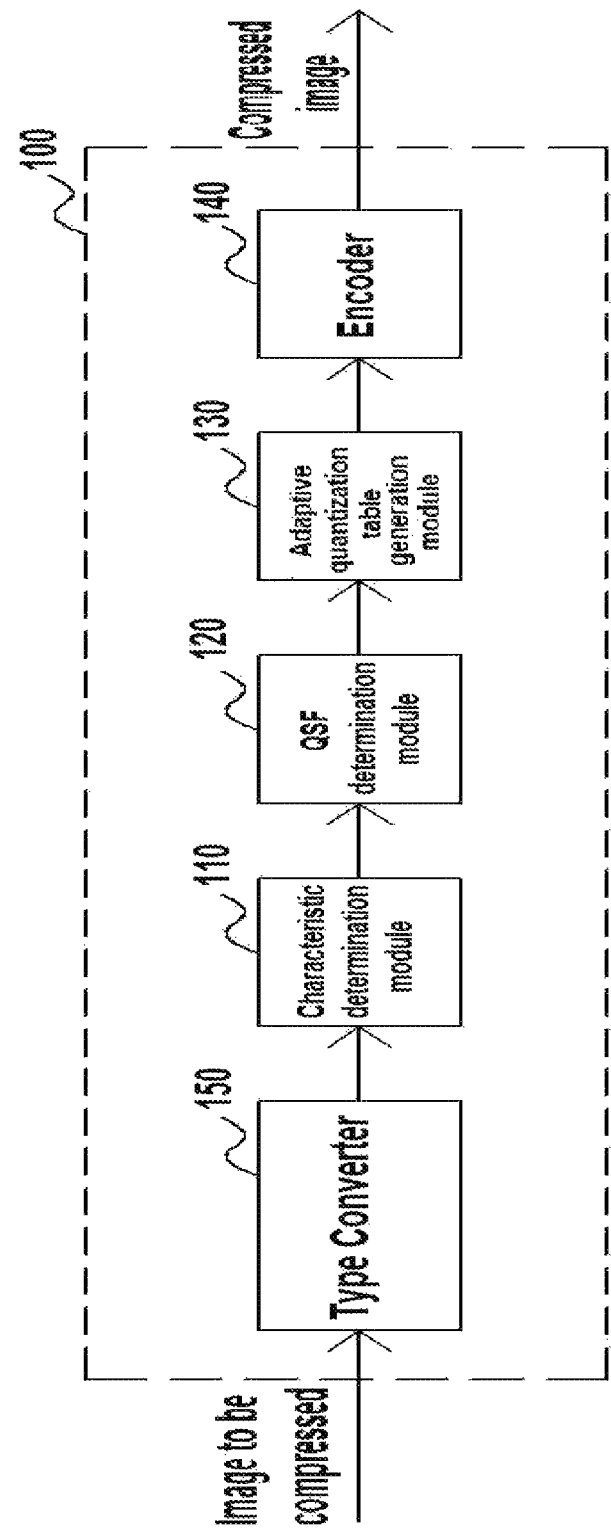
FIG. 3 is a block diagram schematically showing an adaptive image compression system according to an embodiment of the present invention.

The present invention has other advantages associated with the operation of the present invention and objects that are realized by the practice of the present invention which will be apparent from, or are set forth in greater detail in the accompanying drawings, which are incorporated herein, and in the following Detailed Description of the Invention, which together serve to explain certain principles of the present invention.

Throughout the specification, it will be understood that, when an element is referred to as 'transmitting' a data to another element, the element not only can directly transmit the data to another element but also indirectly transmit the data to another element via at least one intervening element.

In contrast, when an element is referred to as 'directly transmitting' a data to another element, the element can transmit the data to another element without an intervening element.

The present invention will now be described more fully hereinafter with reference to the accompanying drawings, in which exemplary embodiments thereof are shown. Reference should be made to the drawings, in which the same reference numerals and signs are used throughout the different drawings to designate the same or similar components.

FIG. 3 is a block diagram schematically showing an adaptive image compression system according to an embodiment of the present invention.

Referring to FIG. 3, the adaptive image compression system 100 according to this embodiment includes a characteristic determination module 110, a quantization scale factor (QSF) determination module 120, an adaptive quantization table generation module 130 and an encoder 140. The adaptive image compression system 100 may also include a type converter 150.

When an image that is to be compressed is received as an input data, the adaptive image compression system 100 can compress the image that is to be compressed using an adapted image compression method according to the technical principle of the invention, and then output the compressed image.

The adaptive image compression system 100 may indicate a construction that is disposed in a predetermined data processing apparatus (e.g. a computer or a mobile terminal) and is systematically combined with a set of hardware, which is provided in the data processing apparatus, and predetermined software codes, which are defined to realize the technical principle of the invention.

Throughout the specification, the term 'module' may indicate a functional and structural combination between a set of hardware, which is intended to realize the technical principle of the invention, and a set of software, which is intended to drive the hardware. For example, the 'module' may indicate a logical unit of predetermined codes and hardware resources which are supposed to carry out the codes, and it will be apparent to a person having ordinary skill in the art that the module is not limited to physically connected codes or one type of hardware.

In some implementations, the adaptive image compression system 100 may be distributed to a plurality of physical devices instead of one physical device. When individual components of the adaptive image compression system 100 are implemented as independent physical devices as required, these physical devices can be systematically combined via wired/wireless networks in order to realize the adaptive image compression system 100 according to the technical principle of the invention.

The characteristic determination module 110 can determine characteristics of an input image that is to be compressed. Specifically, the characteristic determination module 110 can determine characteristics related to compression, such as complexity which indicates whether the image that is to be compressed is a complicated image or a simple image, image quality, types (gradation, strong edge, texture, or the like), or the like. These characteristics of the image that is to be compressed may be characteristics that may be considered since the adaptive image compression system 100 carries out lossy compression. This is because the image that is to be compressed may be an image, the visible image quality of which is not greatly influenced when information is lost to a certain degree, or an image, the visible image quality of which is greatly influenced when information is lost to a certain degree, depending on its characteristics.

Therefore, according to the technical principle of the invention, the characteristics of the image that is to be compressed are determined by a process that will be described later, and the degree to which compression is to be carried out, or a quantization scale factor (QSF), is determined based on the determined characteristics. Accordingly, there is an effect in that adaptive compression can be carried out to the image that is to be compressed. In addition, unlike the method of the related art which carries out optimum compression by determining whether or not an artifact is present after iteratively compressing an image that is to be compressed irrespective of the characteristics of the image, it is possible to carry out compression in one compression step after determining the degree, to which the compression is to be carried out, depending on an image that is to be compressed.

For this, when the characteristics of the image that is to be compressed is determined by the characteristic determination module 110, the QSF determination module 120 can adaptively determine a QSF value depending on the determined characteristics of the image. The QSF value can indicate the compression scale, i.e. a value presenting the degree of quantization.

In addition, the QSF value determined by the QSF determination module 120 can be used for determining each value of a quantization table that is to be used for actual quantization. For this, the adaptive quantization table generation module 130 can receive the QSF value determined by the QSF determination module 120, and generate the quantization table that is to be used for quantization of the image that is to be compressed.

The quantization table is information that is used for determining how much a DCT coefficient value of a block is to be quantized. In general, the JPEG standard can quantize all blocks included in the image that is to be compressed using one quantization table. The JPEG standard can divide the image that is to be compressed into blocks having 8×8 pixels, and carry out quantization for each of the blocks. In addition, the quantization table can also be defined as an array of 8×8 elements for quantization of each pixel of each block. The adaptive quantization table that is generated according this embodiment of the invention can also be configured as an array of 8×8 elements. However, since the technical principle of the invention can be applied irrespective of the size of the blocks obtained by dividing the image that is to be compressed, a person having ordinary skill in the art will easily appreciate that the size of each block and the size of the adaptive quantization table can be variously modified.

According to an embodiment, the adaptive quantization table generation module 130 can generate the adaptive quantization table in a predetermined scheme using the QSF value determined by the QSF determination module 120. The scheme can be separately devised for the technical principle of the invention. According to another embodiment, the adaptive quantization table generation module 130 can also generate the adaptive quantization table using the determined QSF value and a standard quantization table defined in the JPEG standard. Alternatively, it is possible to define a quantization table that is to be used for the technical principle of the invention, and then generate the adaptive quantization table using the defined quantization table and the QSF value. Like this, the adaptive quantization table can be generated using one of the newly-defined quantization table and the standard quantization table and the QSF value. The quantization table that is used for generating the adaptive quantization table will be defined as a reference quantization table in the specification. The quantization table can be separately generated according to the image that is to be compressed, or the standard quantization table defined by the JPEG standard can be used. When the standard quantization table is used as the reference quantization table, it is possible to realize the technical principle of the invention by simply modifying an existing JPEG standard compression system.

For example, when the QSF value is determined, the adaptive quantization table generation module 130 can determine the values of the elements of the adaptive quantization table by performing an operation using the values of the elements of the reference quantization table and the QSF value. The operation may be a simple operation of multiplying the values of the elements of the reference quantization table with the QSF value, or a predetermined constant may be added after the multiplication. The values of the elements of the adaptive quantization table can be generated by a variety of other schemes, based on the values of the elements of the reference quantization table and the QSF value.

The adaptive quantization table that is generated for the image that is to be compressed can be one table. Specifically, all of the blocks of the image that is to be compressed can be quantized using one adaptive quantization table generated by the adaptive quantization table generation module 130.

The encoder 140 can encode each of the blocks that are included in the image that is to be compressed as defined by the JPEG standard using the adaptive quantization table generated by the adaptive quantization table generation module 130.

The type converter 150 can convert the type of the image that is to be compressed into a gray image and a color image. Methods of converting the image that is to be compressed into a gray image are well known, and descriptions thereof will be omitted. In general, an image can be divided into a gray image and a color image, and it is known that the gray image represents the characteristics of the image better. Therefore, according to the technical principle of the invention, it is possible to determine the characteristics of the image that is to be compressed using the gray image.

According to the technical principle of the invention for determining the characteristics of the image that is to be compressed, the adaptive image compression system 100 can divide the image that is to be compressed into a plurality of blocks, calculate characteristic values for the respective blocks, and determine the overall characteristics of the image that is to be compressed based on the calculated characteristic values for the respective blocks.

Such an example will be described in more detail with reference to FIG. 4.

Figure 4:
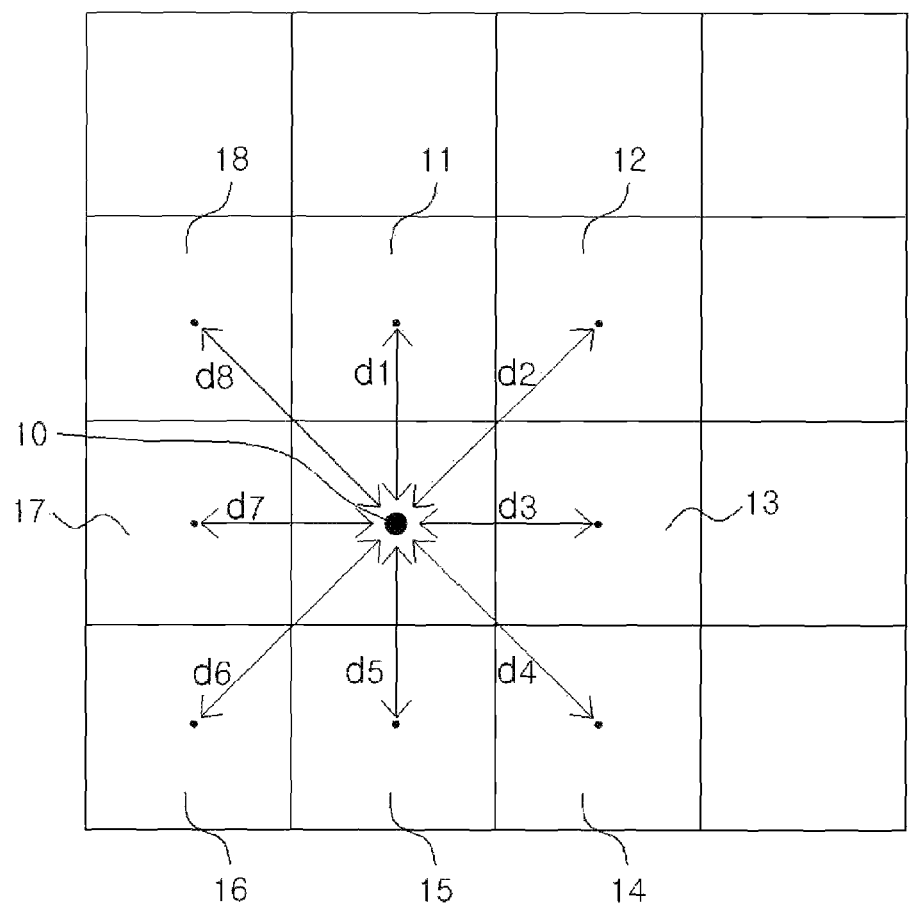
FIG. 4 is a view showing a method of determining an image characteristic value for each block of an image that is to be compressed in an adaptive image compression method according to an embodiment of the present invention.

FIG. 4 is a view showing a method of determining an image characteristic value for each block of an image that is to be compressed in an adaptive image compression method according to an embodiment of the present invention.

Referring to FIG. 3 and FIG. 4, a data, the type of which is converted into a gray image by the type converter 150, can be input into the characteristic determination module 110. The gray image can be, for example, a data that has the luminance of the image, and be stored in a predetermined buffer. Then, the characteristic determination module 110 can read out the data from the buffer. Of course, in the case in which an encoded image file (e.g. a JPEG file) is input into the adaptive image compression system 100, the encoded image file can be decoded and converted into a data (an RGB original image) that corresponds to the original image by a predetermined decoder, and then be input into the type converter 150.

The characteristic determination module 110 can divide an image into a plurality of blocks. In an example, the characteristic determination module 110 can set the size of the blocks to 8×8 as in the JPEG standard. However, the invention is not limited thereto.

The characteristic determination module 110 can calculate a characteristic value of each of the divided blocks. The characteristic value may be information that is indicative of the characteristic of a partial image corresponding to each block. The characteristic value can be a value related to the scale of compression of each block. In the specification, the characteristic value is named as a block quality indicator (BQI). The overall characteristics of the image that is to be compressed can be determined based on the BQI for each block.

As shown in FIG. 4, the BQI can be calculated by an average of differential values of pixels included in the block. A high average of differential values is indicative that the complexity of the partial image corresponding to the block is high or much of the luminance in the partial image is changed. The high average of differential values, i.e. the high BQI, is indicative that a visible degradation in image quality is relatively low when the compression ratio of the image is high.

Differential values of one pixel (e.g. 10) from among pixels included in the block are indicative of an average of differences (d1 to d7) between the value of the pixel 10 and the values of adjacent pixels (11 to 17). When the differential values of one pixel included in the block are determined in this fashion, differential values can also be determined for the remaining pixels in the same fashion. Then, the characteristic determination module 110 can calculate the respective differential values for all of the pixels included in the block, thereby calculate the BQI of the block.

Consequently, the characteristic determination module 110 can calculate BQIs for all blocks.

After that, the characteristic determination module 110 can output the BQIs, which are calculated for the respective blocks, to the QSF determination module 120. Then, the QSF determination module 120 can determine the characteristics of the image that is to be compressed based on the received BQIs for the respective blocks.

There are a variety of methods of determining the characteristics of an image that is to be compressed based on BQIs. In an example, it is possible to determine a predetermined representative value, such as an arithmetic mean value, of the BQIs as the characteristics of the image that is to be compressed. Any of the methods can determine entire characteristics of the image that is to be compressed based on the BQIs. The characteristics can be a predetermined value that is indicative of the scale at which the image that is to be compressed can be compressed or means a combination or statistic of the BQI values. A variety of implementations are possible which can determine the characteristics.

According to an embodiment, the QSF determination module 120 can classify the individual BQIs, which correspond to the received blocks, based on a predetermined classification reference. Specifically, the characteristic of each of the blocks can be classified based on the classification reference, and the entire characteristics of the image that is to be compressed can be determined using a result of the classification.

Figure 5:
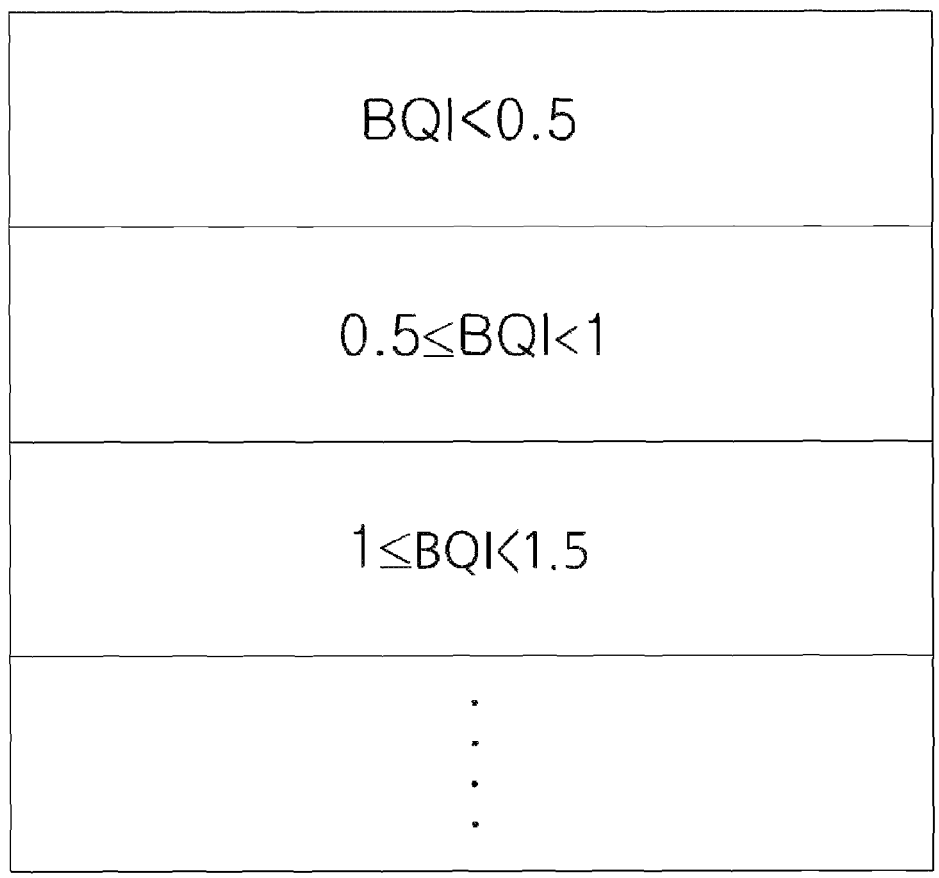
FIG. 5 is a diagram illustrating a method of determining a characteristic for each block of an image that is to be compressed according to an embodiment of the present invention.

Such an example is shown in FIG. 5.

FIG. 5 is a diagram illustrating a method of determining a characteristic for each block of an image that is to be compressed according to an embodiment of the present invention.

Referring to FIG. 5, the QSF determination module 120 can store a reference in advance such that the BQI of each block is classified into a predetermined range based on the reference. In addition, as shown in FIG. 5, it is possible to classify a block, the BQI of which is within a first range (e.g.

a range that is smaller than 0.5), into a first category, a block, the BQI of which is in a second range (e.g. a range that is equal to or greater than 0.5 and smaller than 1), into a second category, and a block, the BQI of which is in a third range (e.g. a range that is equal to or greater than 1 and smaller than 1.5), into a third category, based on the classification reference.

Consequently, blocks having similar characteristics can be classified in the same category. Then, the QSF determination module 120 can determine the characteristics of the image that is to be compressed based on the number of the blocks of the image that correspond to a particular category. For example, when a majority of the blocks corresponds to the first category, a small compression ratio may be required for no visible image quality degradation in many of the blocks. Therefore, in this case, when the compression ratio of the entire image that is to be compressed is low, the QSF determination module 120 can determine the image that is to be compressed as an image that has no visible degradation in image quality. Consequently, a suitable QSF value can be determined. Of course, the QSF determination module 120 can determine the characteristics of the image that is to be compressed, i.e. the QSF indicative of the scale to which the image is to be compressed, based on the number of blocks that correspond to a variety of other categories in addition to the first category.

At any cases, the QSF determination module 120 can determine the QSF based on the BQIs of the blocks calculated by the characteristic determination module 110.

A QSF value that is to be determined based on the BQI classification reference, i.e. the classification reference values of BQIs, and the classified BQIs, can be experimentally obtained and be stored in advance in the adaptive image compression system 100. In an example, the reference value (e.g. 0.5) for the first category can be obtained by iteratively carrying out experiments and inspecting results of compression. In addition, information about the QSF value, i.e. a QSF determination list, which is experimentally obtained based on the values of the BQIs, the distribution of the BQIs and the number of blocks belonging to a particular category (or the ratio of such blocks in the entire blocks), may be stored in advance in the adaptive image compression system 100. In addition, the QSF value can be determined based on the QSF determination list.

When the QSF value is determined in this fashion, the determined QSF value can be output to the adaptive quantization table generation module 130. The adaptive quantization table generation module 130 can generate an adaptive quantization table based on the received QSF value. In addition, as described above, the standard quantization table can be used in order to generate the adaptive quantization table.

When the adaptive quantization table is generated in this fashion, the encoder 140 can encode each of the blocks while carrying out quantization for each block using the generated adaptive quantization table.

As above, according to the technical principle of the invention, the QSF determination module 120 determines the QSF value indicative of the entire characteristics of the image that is to be compressed, and the adaptive quantization table is generated based on the determined QSF value, because the JPEG standard regulates that all of the blocks be compressed, or quantized, at the same compression scale. That is, quantization is carried out for each of the blocks using the same adaptive quantization table. Therefore, according to the technical principle of the invention, it is possible to generate one adaptive quantization table by considering the entire characteristics of the image and quantize all of the blocks using the adaptive quantization table. Accordingly, the technical principle of the invention realizes quantization according to the characteristics of the image, whereas the method of the related art carries out quantization for respective blocks at the same compression scale irrespective of the characteristics of the image. In other words, the method of the related art carries out quantization using the same adaptive quantization table depending on the compression scale irrespective of the characteristics of the image, instead of using a quantization table that is suitable for a specific image. In contrast, according to the invention, since quantization is carried out after a suitable quantization table is determined depending on the characteristics of a specific image, efficient compression is possible.

In addition, the adaptive quantization table generation module 130 can of course generate a gray adaptive quantization table and a color adaptive quantization table based on the determined QSF value. It is possible to generate the gray adaptive quantization table, which will be used for quantization of a gray image, and a color adaptive quantization table, which will be used for quantization of a color image. At this time, it is of course possible to generate a gray adaptive quantization table and a color adaptive quantization table using the gray reference quantization table, the color reference quantization table and the QSF value. Then, the encoder 140 can generate a compressed image by carrying out encoding by generating a quantized gray image and a quantized color image. As is well known, the compression efficiency can be guaranteed when the characteristics of the image that is to be compressed are estimated using the gray image and the estimated characteristics are applied to the color image.

According to the technical principle of the invention, it is possible to complete compression in one compression step by determining in advance the scale at which the image is to be compressed (i.e. determination based on the adaptive quantization table), unlike the compression method of the related art which repeats the process of compressing the image corresponding to the reference quantization table and then inspecting whether or not an artifact is present. Consequently, there is significant improvement in performance due to the increased compression speed. In addition, since the characteristics of the image that is to be compressed are considered in advance, similar image quality can be guaranteed to a certain level after completion of the compression. Of course, in this case, it is required to define in advance BQIs, which are calculated for determination of the characteristics of the image that is to be compressed, and a suitable reference, based on which a QSF value is determined using the BQIs.

The technical principle of the invention can be applied not only to the case in which the image that is to be compressed is a JPEG image, but also to various types of images. That is, the technical principle of the invention is applicable when a decoder for decoding the image that is to be compressed is provided and an RGB original image can be acquired using the decoder.

FIG. 6 is a table showing a performance simulation result obtained by an adaptive image compression method according to an embodiment of the present invention.

FIG. 6 shows results obtained by recompressing original JPEG images by the compression method according to the technical principle of the invention (Atom JPEG) and by the iterative compression method of the related art as described above (JPEG Mini), the original JPEG images being produced by compressing raw images of 1.9M, 11M, 15M and 21M.

Referring to FIG. 6, it can be appreciated that all of the four images obtained by the compression method according to the technical principle of the invention exhibit higher peak signal to noise ratios (PSNRs). It can be appreciated that the images obtained by the compression method according to the invention also exhibit higher compression ratios except for the original image of 21M. According to the experimental results, the compression method according to the technical principle of the invention generally provides a higher compression ratio.

Nevertheless, the compression method according to the technical principle of the invention exhibits a significantly higher compression speed than the method of the related art. Therefore, it can be appreciated that the compression method according to the technical principle of the invention has the excellent effect of improved performance compared to the compression method of the related art.

The adaptive image compression method according to an embodiment of the invention can be embodied as computer readable codes that are stored in a computer readable record medium. The computer readable record medium includes all sorts of record devices in which data that are readable by a computer system are stored. Examples of the computer readable record medium include read only memory (ROM), random access memory (RAM), compact disc read only memory (CD-ROM), a magnetic tape, a hard disc, a floppy disc, an optical data storage device and the like. Further, the record medium may be implemented in the form of a carrier wave (e.g. Internet transmission). In addition, the computer readable record medium may be distributed to computer systems over a network, in which the computer readable codes are stored and executed in a decentralized fashion. In addition, functional programs, codes and code segments for embodying the invention can be easily construed by programmers having ordinary skill in the art to which the invention pertains.

MR While the present invention has been described with reference to the certain exemplary embodiment which is shown in the drawings, it will be understood by a person having ordinary skill in the art that various changes in forms and details and various modified embodiments may be made therefrom. Therefore, the true scope of the present invention shall be defined by the technical principle of the appended claims.

What is claimed is:

1. An adaptive image compression method comprising:
   determining, at an adaptive image compression system, characteristics of an image that is to be compressed;
   determining, at the adaptive image compression system, a quantization scale factor based on the characteristics of the image that is to be compressed;
   generating an adaptive quantization table corresponding to the image that is to be compressed based on the determined quantization scale factor; and
   encoding the image that is to be compressed using the generated adaptive quantization table,
   wherein determining, at the adaptive image compression system, the characteristics of the image that is to be compressed comprises:
   dividing a gray image corresponding to the image that is to be compressed into a plurality of blocks;
   calculating a characteristic value of each of the divided blocks; and
   determining the characteristics of the image that is to be compressed based on the calculated characteristic value of each of the divided blocks.

2. The adaptive image compression method of claim 1, wherein calculating the characteristic value of each of the divided blocks comprises:
   calculating, at the adaptive image compression system, an average value of each differential value of pixels that are included in one of the blocks, wherein the differential value is an average of differences between a pixel value of a predetermined pixel and pixel values of pixels surrounding the predetermined pixel.

3. The adaptive image compression method of claim 1, wherein determining the characteristics of the image that is to be compressed based on the calculated characteristic value of each of the divided blocks comprises:
   classifying, at the adaptive image compression system, a characteristic of each of the blocks based on the characteristic value of each of the blocks; and
   determining the characteristics of the image that is to be compressed based on the classified characteristic of each of the blocks.

4. An adaptive image compression method comprising:
   determining, at an adaptive image compression system, characteristics of an image that is to be compressed;
   determining, at the adaptive image compression system, a quantization scale factor based on the characteristics of the image that is to be compressed;
   generating an adaptive quantization table corresponding to the image that is to be compressed based on the determined quantization scale factor; and
   encoding the image that is to be compressed using the generated adaptive quantization table,
   wherein determining, at the adaptive image compression system, the quantization scale factor based on the characteristics of the image that is to be compressed comprises
   determining, at the adaptive image compression system, a quantization scale factor value corresponding to the image that is to be compressed based on a quantization scale factor determination list that includes information about a corresponding quantization scale factor value according to the determined characteristics of the image that is to be compressed.

5. An adaptive image compression method comprising:
   determining, at an adaptive image compression system, characteristics of an image that is to be compressed;
   determining, at the adaptive image compression system, a quantization scale factor based on the characteristics of the image that is to be compressed;
   generating an adaptive quantization table corresponding to the image that is to be compressed based on the determined quantization scale factor; and
   encoding the image that is to be compressed using the generated adaptive quantization table,
   wherein generating the adaptive quantization table corresponding to the image that is to be compressed based on the determined quantization scale factor comprises:
   generating, at the adaptive image compression system, a gray adaptive quantization table and a color adaptive quantization table based on the determined quantization scale factor and a reference quantization table.

6. A non-transitory computer readable record medium which stores therein a program for carrying out an adaptive image compression method comprising:
   determining, at an adaptive image compression system, characteristics of an image that is to be compressed;
   determining, at the adaptive image compression system, a quantization scale factor based on the characteristics of the image that is to be compressed;
   generating an adaptive quantization table corresponding to the image that is to be compressed based on the determined quantization scale factor; and
   encoding the image that is to be compressed using the generated adaptive quantization table, wherein determining, at the adaptive image compression system, the characteristics of the image that is to be compressed comprises:
dividing a gray image corresponding to the image that is to be compressed into a plurality of blocks;
calculating a characteristic value of each of the divided blocks; and
determining the characteristics of the image that is to be compressed based on the calculated characteristic value of each of the divided blocks.

7. An adaptive image compressing system comprising:
a characteristic determination module which determines characteristics of an image that is to be compressed;
a quantization scale factor determination module which determines a quantization scale factor based on the determined characteristics of the image that is to be compressed;
an adaptive quantization table generation module which generates an adaptive quantization table corresponding to the image that is to be compressed based on the determined quantization scale factor; and
an encoder which encodes the image that is to be compressed using the generated adaptive quantization table,
wherein the characteristic determination module divides a gray image corresponding to the image that is to be compressed into a plurality of blocks, calculates a characteristic value of each of the divided blocks, and determines the characteristics of the image that is to be compressed based on the calculated characteristic value of each of the divided blocks.

8. The adaptive image compressing system of claim 7, wherein the characteristic determination module calculates an average value of each differential value of pixels included in one of the blocks as the characteristic value, wherein the differential value is an average of differences between a pixel value of a predetermined pixel and pixel values of pixels surrounding the predetermined pixel.

9. The adaptive image compressing system of claim 7, wherein the characteristic determination module classifies a characteristic of each of the blocks based on a classification reference of the characteristic value of each of the blocks, and determines the characteristics of the image that is to be compressed based on the classified characteristic of each of the blocks.

10. An adaptive image compressing system comprising:
a characteristic determination module which determines characteristics of an image that is to be compressed;
a quantization scale factor determination module which determines a quantization scale factor based on the determined characteristics of the image that is to be compressed;
an adaptive quantization table generation module which generates an adaptive quantization table corresponding to the image that is to be compressed based on the determined quantization scale factor; and
an encoder which encodes the image that is to be compressed using the generated adaptive quantization table,
wherein the quantization scale factor determination module determines a quantization scale factor value corresponding to the image that is to be compressed based on a quantization scale factor determination list that includes information about a corresponding quantization scale factor value according to the determined characteristics of the image that is to be compressed.

11. An adaptive image compressing system comprising:
a characteristic determination module which determines characteristics of an image that is to be compressed;
a quantization scale factor determination module which determines a quantization scale factor based on the determined characteristics of the image that is to be compressed;
an adaptive quantization table generation module which generates an adaptive quantization table corresponding to the image that is to be compressed based on the determined quantization scale factor; and
an encoder which encodes the image that is to be compressed using the generated adaptive quantization table,
wherein the adaptive quantization table generation module generates a gray adaptive quantization table and a color adaptive quantization table based on the determined quantization scale factor and a reference quantization table.

12. A non-transitory computer readable record medium which stores therein a program for carrying out an adaptive image compression method comprising:
determining, at an adaptive image compression system, characteristics of an image that is to be compressed;
determining, at the adaptive image compression system, a quantization scale factor based on the characteristics of the image that is to be compressed;
generating an adaptive quantization table corresponding to the image that is to be compressed based on the determined quantization scale factor; and
encoding the image that is to be compressed using the generated adaptive quantization table,
wherein determining, at the adaptive image compression system, the quantization scale factor based on the characteristics of the image that is to be compressed comprises,
determining, at the adaptive image compression system, a quantization scale factor value corresponding to the image that is to be compressed based on a quantization scale factor determination list that includes information about a corresponding quantization scale factor value according to the determined characteristics of the image that is to be compressed.

13. A non-transitory computer readable record medium which stores therein a program for carrying out an adaptive image compression method comprising:
determining, at an adaptive image compression system, characteristics of an image that is to be compressed;
determining, at the adaptive image compression system, a quantization scale factor based on the characteristics of the image that is to be compressed;
generating an adaptive quantization table corresponding to the image that is to be compressed based on the determined quantization scale factor; and
encoding the image that is to be compressed using the generated adaptive quantization table,
wherein generating the adaptive quantization table corresponding to the image that is to be compressed based on the determined quantization scale factor comprises:
generating, at the adaptive image compression system, a gray adaptive quantization table and a color adaptive quantization table based on the determined quantization scale factor and a reference quantization table.

* * * * *